Figure 1:
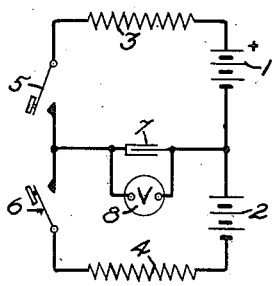

Feb. 17, 1925.

R. V. L. HARTLEY 1,526,337

METHOD AND APPARATUS FOR MEASURING TIME INTERVALS

Filed Nov. 11, 1919

Inventor:
Ralph V.L. Hartley.
by Jack C.R. Palmer
Atty.

Patented Feb. 17, 1925.

1,526,337

UNITED STATES PATENT OFFICE.

RALPH V. L. HARTLEY, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD AND APPARATUS FOR MEASURING TIME INTERVALS.

Application filed November 11, 1919. Serial No. 337,270.

*To all whom it may concern:*

Be it known that I, RALPH V. L. HARTLEY, a citizen of the United States, residing at East Orange, in the county of Essex and State of New Jersey, have invented certain new and useful Improvements in a Method and Apparatus for Measuring Time Intervals, of which the following is a full, clear, concise, and exact description.

The invention relates to a method and apparatus for measuring very small time intervals. The method and apparatus of the invention is particularly designed for the purpose of measuring the short interval of time which may elapse between the arrival of a vibratory impulse, such as a sound wave, at two slightly separated points. When such time interval has been accurately determined, it is possible, knowing the separation of the two points and the velocity of the vibration in the medium through which it is propagated to determine the direction of propagation of the vibrations in question. This interval is, unless the points of arrival are very widely separated indeed, entirely too small to be measured by the usual direct method by means of stop watches, or other mechanically operated timing devices.

The present invention, however, provides a method by which such short time intervals can be accurately measured, which method consists fundamentally in measuring the quantity of electricity transferred by a known current during the time interval in question. The invention also provides instrumentalities whereby a condenser or other energy-storing device may be caused to accumulate a quantity of electricity during the interval which it is desired to measure, and which quantity can be subsequently accurately measured to determine the time interval. In accordance with a feature of the invention, there is provided a condenser which is normally without a charge, connected in the common portion of two similar parallel circuits. The potentials of the parallel circuits oppose each other in this common portion. If one of these circuits is opened at one point, a state of unbalance exists which results in the flow of a charging current in the other circuit to charge the condenser which continues to charge until the other circuit is also opened, the capacity of the condenser and the characteristics of the parallel circuits being such that the condenser will not become fully charged during the interval between the openings of the circuits.

The invention also provides instrumentalities whereby the successive opening of the circuits in question may be accomplished in response to the arrival at two separated points of an impulse. Obviously, in view of the smallness of the interval which it is desired to measure, the ordinary means of opening and closing circuits are inapplicable to measure such intervals, due to the time consumed in the operation of such devices. Therefore, in accordance with another feature of the invention, a circuit arrangement is provided in which the arrival of an impulse at two separated points is accurately determined by two successsive changes in the electrical conditions existing in such circuit arrangement, which changes are brought about without introducing any substantial time interval.

Figure 2:
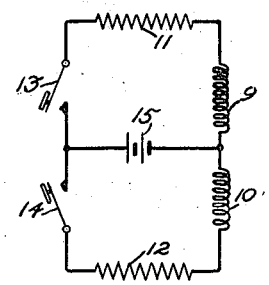
Figure 3:
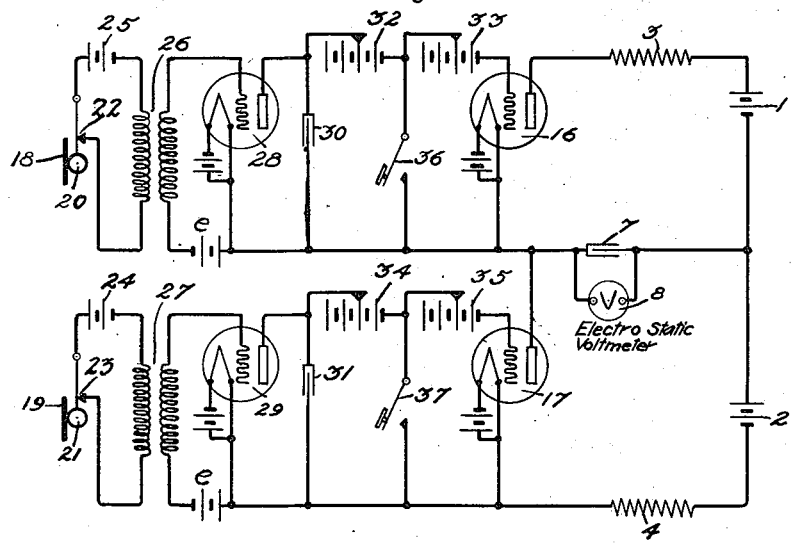

These and other features of the invention will be more clearly understood from the accompanying drawings in which Figs. 1 and 2 are diagrammatic representations of the fundamental circuit arrangement underlying the method of the invention; and Fig. 3 is a diagrammatic representation of a complete assembly of apparatus and circuits for carrying out the method of the invention.

In Fig. 1, there is shown a series circuit including two sources of potential 1 and 2, two resistances 3 and 4 and two keys 5 and 6. Dividing this circuit into two similar parallel circuits is a path including a condenser 7. Bridged across the terminals of the condenser 7 is an electrostatic voltmeter indicated at 8, the purpose of which is to measure the quantity of electricity accumulated by the condenser 7. When both keys 5 and 6 are closed, current will flow from the battery 1 and battery 2 in series, through the resistances 3 and 4 also in series, and if the potentials of the batteries 1 and 2 are made equal and resistance 3 is equal to resistance 4, the voltage across the terminals of the condenser 7 is obviously zero. If, now, one of the keys, say 5, is opened, the current flow from the battery 1 through the resistance 3 is interrupted, while a charging current for the condenser 7 flows from the battery 2 through the resistance 4 and key 6. The condenser 7 will, therefore, continue to charge until the key 6 is opened, the capacity of condenser 7 and the values of the resistances 3 and 4 being such that the condenser will not become fully charged during the interval between the openings of keys 5 and 6. If, now, the time interval between the opening of the key 5 and the key 6 is the interval which it is desired to measure, the quantity of electricity stored by the condenser 7 is an accurate measure of the time interval. For example, if an electrostatic voltmeter 8 is used to measure the steady value V of the voltage across the condenser after both keys 5 and 6 have been opened, and if the capacity C of the condenser 7 and the current I normally flowing through the circuit 1, 3, 5, 6, 4, 2 is known, the interval T between the opening of keys 5 and 6 is given quite closely by the expression $T = \frac{CV}{I}$. This expression assumes that I, which is the current normally flowing through the resistances 3 and 4 (also through the plate circuit of tubes 16 and 17 of Fig. 3) and the initial value of the current charging the condenser 7, is constant during the interval the condenser is being charged. As the percent error due to the actual decrease in current, is small when the interval to be measured is very small this expression is sufficiently accurate for all practical purposes. For greater accuracy use may be made of the exponential relation $$T = -RC \, \mathrm{Log}_e \left(1 - \frac{V}{E}\right)$$

where E is the voltage of the battery 1 or 2 and R the resistance of 3 or 4.

An alternative arrangement is shown in Fig. 2 in which a ballistic galvanometer is employed to measure the quantity of electricity transferred during the time interval which it is desired to measure. In this arrangement, a circuit including the coils 9 and 10 of a ballistic galvanometer, the equal resistances 11 and 12 and the keys 13 and 14, is supplied by a common battery 15 which is connected between the coils 9 and 10 and the keys 13 and 14. The windings 9 and 10 of the ballistic galvanometer are of equal resistance, and the direction of such windings is chosen so that the attractions produced thereby normally oppose each other. As the resistances 11 and 12 are equal, when the keys 13 and 14 are closed, no force is exerted on the moving system of the galvanometer. During the interval between the opening of the two keys 13 and 14, which as in the former case, represents the time interval which it is desired to measure, current will flow in only one of the coils 9 or 10, depending on which key is opened first.

Under these conditions, the quantity of electricity represented by the expression Q=IT, passes through the galvanometer. Since I is known and Q is indicated by the displacement of the moving system of the galvanometer, T may be calculated. The displacement of the galvanometer may be recorded, for example, by causing a beam of light to traverse a piece of sensitized paper. Obviously, other measuring instruments which will give an indication or record of the quantity of current flow during the time interval, could be used in a circuit arrangement similar to that described above.

In the embodiment of the invention shown in Fig. 3, an arrangement is disclosed which is designed to measure the very small time interval which may exist between the arrival of a vibratory impulse at two rather closely spaced points. The arrangement is particularly designed to accomplish that which is accomplished by various methods of comparison known as the binaural method of locating the direction of a source of sound. As is well known, the binaural method, which involves the auditory sense of an individual making a comparison between the time of arrival at two slightly separated points of sound impulses, depends upon a psychological indication of the difference in time of arrival at such separated points of the sound impulses. The arrangement disclosed in Fig. 3 provides a means for locating the direction of the source of vibration or impulse, which is independent of this psychological effect known as the binaural sense. In the circuit arrangement shown in Fig. 3, the batteries 1 and 2, resistances 3 and 4, the condenser 7 and electrostatic voltmeter 8, correspond with similarly designated elements of Fig. 1. The series circuit including the batteries 1 and 2, however, instead of passing through keys 5 and 6, pass from filament to plate in thermionic discharge tubes 16 and 17. These tubes may be of the well-known three-element audion type.

At the left of Fig. 3, there is indicated diagrammatically, two sound responsive devices 18 and 19, which may be of any well-known type such as the ordinary microphonic transmitter. In the type disclosed, which is particularly adapted for the purposes of the present invention, weighted balls, indicated at 20 and 21, respectively, rest upon diaphragms and the movement of such diaphragms in response to sound waves causes a variation in the resistance of the so-called imperfect contacts 22 and 23 controlled by said balls. Sources of potential 24 and 25 are included in the circuit with the imperfect contacts. The arrangement is such that when the diaphragms are moved in response to a sound or other vibration, a pulsating E. M. F. is set up in the circuits including the batteries 25 and 24 and the contacts 22 and 23. These circuits are inductively connected, by means of induction or repeating coils 26 and 27, with the input circuit of the thermionic discharge tubes 28 and 29, respectively. Connected across the output circuits of these tubes are condensers 30 and 31. Also included in series in the output circuit of these tubes are the variable batteries 32, 33 and 34, 35, the grids of the discharge tubes 16 and 17, and the filaments of such discharge devices which are connected to the filament of the discharge devices 28 and 29. Bridging these circuits between the batteries 32 and 33, 34 and 35 are the keys 36 and 37.

It has been demonstrated as disclosed in a reissue Patent 15,538 of February 13, 1923, to Edwin H. Colpitts, that a three-element discharge tube of the type disclosed therein may be adjusted by selecting the potential between the grid and the filament so that there is no current flow between the filament and plate electrodes. When adjusted to provide this condition, the device is very sensitive to minute changes in the potential between the filament and grid and advantage is taken of this fact in the present invention. Advantage is also taken of the well known fact that the grid may be made sufficiently negative to require a definite change in the grid potential before current flow will take place in the plate circuit in order to prevent slight disturbances from affecting the device.

Two thermionic tubes are included in each of the two circuits, one of such tubes acting as a very sensitive trigger device and the other tube acting as a circuit-opening or cut-off device. Thus, the tubes 28 and 29 are made to operate as trigger devices by adjusting the relative potentials on the electrodes thereof so that a condition of zero current flow is obtained between the filament and the plate. The tubes 16 and 17 which operate as cut-off devices are, by means of an adjustment of the relative potentials on the electrodes, adjusted so that there is a steady predetermined current flow between the filament and plate of these tubes. The output circuits of the tubes 28 and 29 are connected respectively to the input circuits of the tubes 16 and 17, the arrangement being such that if the relative potentials on the electrodes of the tubes 28 and 29 are changed, there is a corresponding change of the relative potentials of the electrodes of the tubes 16 and 17 which change, as will presently appear, is sufficient to stop the normal flow of current through the plate circuits of the tubes 16 and 17. To so adjust the potentials on the electrodes of the vacuum tubes, the keys 36 and 37 are closed and the voltages of the batteries 32, 33, 34 and 35 are adjusted until the current from filament to plate in the tubes 28 and 29 is reduced to zero as determined by the ammeters 38 and 39. The keys 36 and 37 are then opened without causing any change in the distribution of the various potentials. The proper value of the currents in the plate circuits which depends on the characteristics of the wave train of the impulse under observation and the capacity of condenser 7, may be obtained by adjusting the battery 33 with keys 36 and 42 closed until there is no current flow indicated by ammeter 40. With key 37 closed, battery 35 is then adjusted until the ammeter 41 indicates the proper current value. The key 42 is then opened, and battery 33 is readjusted until the potential as indicated by the electrostatic voltmeter across condenser 7 is zero. Before opening the key 42, it is advisable for the protection of voltmeter 8 to adjust the current flow in both circuits to substantially the same value. Resistances 3 and 4 may be adjustable to assist in obtaining the proper circuit balance. If now, with the apparatus in the adjusted condition and with keys 36, 37 and 42 open, a sound, such as a report of a gun, or other source of wave energy operates the detectors 18 and 19, the following operation will take place: Assuming that the wave energy which is of a transient nature is propagated along a line at such an angle to the base line joining the two detectors 18 and 19 that the detector 18 will be operated before 19; the operation of the detector 18 will cause a current flow in its associated local circuit which will, through the instrumentality of the repeating coil 26, vary the potential on the grid of the tube 28. The relation of the grid and plate potentials having been previously adjusted for the energy from the vibrations it is desired to observe, the balanced condition of potentials in the tube 28 will be disturbed and during the time that the voltage of the grid of the tube 28 is above that for which it has been adjusted, current will flow between the filament and the plate. For example if the grid potential is just sufficiently negative to reduce the plate current to zero, any slight disturbance will make the grid potential less negative and will cause current to flow in the plate circuit. However, in many cases it may be desirable to lower the grid potential, that is, make it more negative than normally required for zero plate current, in order to eliminate the effect of minor disturbances occuring at the time observations are being made. In the latter case, the tubes 28 and 29 will operate only when the energy wave is sufficient to raise the grid potential, (make it less negative) above that required to just balance the two tubes for zero plate current.

This current will be supplied by the discharge of the condenser 30 through the plate circuit of the tube 28 with an attendant drop in the voltage of condenser 30. As a result, the voltage of tube 16, which is conductively connected with the plate of tube 28 and with condenser 30, and otherwise insulated from the filament of tube 16 will be lowered (made more negative) at the same rate as the voltage across condenser 30. When it has fallen to a sufficient negative value determined by the constants of the tube and the potential of the plate circuit of the tube, the current normally flowing in the plate circuit of the tube 16 will be reduced to zero. The tube 16 acts, therefore, as a cut-off device, and the same effect is obtained with respect to the condenser 7 as that described when the key 5 is opened in the circuit of Fig. 1. Similarly, in response to the operation of the detector 19, the condenser 31 will discharge through the plate circuit of the tube 29 which will, in turn, lower the voltage on the grid of the tube 17, that is, make the grid more negative, until the current in the plate circuit of such tube is reduced to zero, producing the effect with respect to condenser 7 identical with that produced when the key 6 in Fig. 1 is opened. It is, therefore, apparent that the condenser 7 will be charged during the interval which elapses between the response of the detectors 18 and 19. The time which elapses between the operation of the detectors and the corresponding cut-off devices is the time which is required for the potentials on the grids of the tubes 16 and 17 to change by a definite amount. This time depends upon the size of capacities 30 and 31 and upon the characteristics of the tubes 16 and 17. By a suitable selection of the capacities of the condensers 30 and 31 and by a selection of tubes of the required characteristics, the time elapsing between the response of the detectors 18 and 19 and the cut-off operation of the tubes 16 and 17 can be made very small indeed, in fact, much smaller than the time of operation of any of the well-known types of mechanical circuit breakers. If desired, this time may be still further diminished by inserting an amplifier between the tubes 28 and 16 and 29 and 17, whereby a smaller change of voltage on the grids of the tubes 28 and 29 will suffice to reduce the current in the plate circuits of the tubes 16 and 17 to zero.

Furthermore, the time intervals between the operation of the detectors and the cut-off tubes in addition to being very small can readily be made to be the same for each detector and the associated cut-off tube, so that the time of charging of the condenser 7 is an accurate measure of the time interval between the successive responses of the detectors.

Before the circuit arrangement of Fig. 3 can again be used for measuring a time interval, it will, of course, be necessary to again close keys 36 and 37 so that condensers 30 and 31 may again be charged and to again adjust the voltages of the batteries 32, 33, 34 and 35 until the required condition as to potentials is obtained in the tubes 28 and 29, 16 and 17 as hereinbefore described.

What is claimed is:

1. In the method of measuring the differences in time of arrival of a sound wave at two separated receiving devices the steps which consist in causing the arrival of said wave at the first of said receiving devices to initiate a flow of current in a circuit common to both said devices, and in causing the arrival of said wave at said second device to stop said flow of current, and measuring the total flow of current.

2. In the method of measuring the differences in time of arrival of a sound wave at two separated receiving devices the steps which consist in causing the arrival of said wave at the first of said devices to initiate the charging of a condenser, and in causing the arrival of said wave at the second said device to stop the charging of said condenser and measuring the charge accumulated by said condenser.

3. In a system for measuring time intervals the combination of two electrical circuits each including a source of potential and a circuit maker and breaker, a condenser included in a common portion of said circuits, and means for measuring the charge accumulated by said condenser.

4. In a system for measuring the time interval between the arrival of the vibratory impulses at separated points the combination of vibration-responsive devices at said points, means controlled by the successive response of said devices to initiate and terminate the transfer of electricity, and means to measure the quantity of electricity transferred.

5. In a system for measuring a time interval between the arrival of vibratory impulses at separated points, the combination of vibration responsive devices at said points, means including electrical discharge devices controlled by the successive response of said devices to initiate and terminate the transfer of electricity, and means to measure the quantity of energy transferred.

6. In a system for measuring the time interval between the arrival of a vibratory impulse at separated points, the combination of vibration-responsive devices at said points, a condenser, means for charging said condenser, means controlled by the response of one of said responsive devices to initiate the charging of said condenser, means controlled by the response of the other responsive device to terminate the charge of the condenser, and means for measuring the charge accumulated by the condenser.

7. In combination, an electric discharge device including an anode, a heated cathode and a control electrode, an electrical circuit including a source of potential and said anode and cathode, a condenser connected across the anode and control electrode, means for charging said condenser, and means for causing the discharge of said condenser to interrupt the electrical continuity of said electrical circuit.

8. In combination, an electric discharge device including an anode and a heated cathode, a condenser connected across said anode and cathode, means for charging said condenser, and means operating upon the electron stream between said anode and cathode to control the discharge of said condenser through said stream.

9. In combination, an electric discharge device including an anode and a heated cathode, a condenser connected across said anode and cathode, means for charging said condenser, and means operating upon the electron stream between said anode and cathode to prevent the discharge of said condenser through said stream.

10. In combination, a plurality of electric discharge devices each including an anode and a heated cathode, a condenser connected across the anode and cathode of one device, and means controlled by the discharge of the condenser through the electron stream of said device to render the electron stream of the other device non-conductive.

11. In combination, a pair of discharge devices each including a heated cathode, a control electrode and an anode, the control electrode of one of such devices being included in circuit with the anode and cathode of the other, and means responsive to an alteration of potential of the control electrode of one device to render the circuit including the cathode and anode of the other device non-conductive.

In witness whereof, I hereunto subscribe my name this 6th day of November A. D., 1919.

RALPH V. L. HARTLEY.